United States Patent [19]

Karmell

[11] 4,051,095
[45] Sept. 27, 1977

[54] HYDROLYZED POLYURETHANE PLASTICIZER

[75] Inventor: Yale Karmell, Chicago, Ill.

[73] Assignee: Samuel Bingham Co., Franklin Park, Ill.

[21] Appl. No.: 652,418

[22] Filed: Jan. 26, 1976

[51] Int. Cl.² .......................... C08K 5/11; C08K 5/12; C08K 5/16
[52] U.S. Cl. ...................... 260/31.8 DR; 260/77.5 A; 260/2.3
[58] Field of Search ........... 260/2.3, 77.5 A, 31.8 DR

[56] References Cited

U.S. PATENT DOCUMENTS

| 2,937,151 | 5/1960 | Broeck et al. | 260/2.3 |
| 3,117,940 | 1/1964 | McElroy | 260/2.3 |
| 3,123,577 | 3/1964 | Heiss | 260/2.3 |
| 3,925,272 | 12/1975 | Ibata et al. | 260/4 |

OTHER PUBLICATIONS

Rubber Age, 85, No. 1 (Apr. 1959), pp. 77–81.
Eupoplastics Monthly, p. 8, (June 1972).

*Primary Examiner*—Stanford M. Levin
*Attorney, Agent, or Firm*—Howard H. Rogers, Jr.

[57] ABSTRACT

A hydrolyzed polyurethane product useful as a plasticizer for acrylonitrile rubbers.

4 Claims, No Drawings

HYDROLYZED POLYURETHANE PLASTICIZER

BACKGROUND OF THE INVENTION

In the printing roller industry, rollers are commonly fabricated of both cast polyurethanes and acrylonitrile rubbers. Each have their place and their particular suitabilities for various ink or other fluid transfer processes.

In the manufacture of rollers there will inevitably be scrap in the way of defective rollers, trimmings, grindings, etc. In addition, as rollers become worn out through use, they are commonly traded in by the printer to the manufacturer. The steel spindle on which the blanket is formed is expensive and reusable. Past practice has been to trim off the worn-out polyurethane blanket and discard it.

SUMMARY OF THE INVENTION

It has been found that hydrolyzing scrap polyurethanes in an autoclave at an elevated temperature and pressure gives rise to a viscous liquid useful as a plasticizer in acrylonitrile rubber compounds.

A preferred acrylonitrile rubber for printing rollers is a copolymer of acrylonitrile and butadiene, conventionally sulphur-cured. To obtain the desired physical properties of the roller, the acrylonitrile-butadiene rubber, unmodified, will cure to a Shore hardness of about 60 on the "A" scale. This hardness is excessive for many ink and other fluid transfer operations. It is therefore necessary to incorporate in the rubber mix a plasticizer to reduce the hardness to about 20 to 50 on the Shore "A" scale.

Acrylonitrile rubbers are incompatible with the majority of plasticizers commonly employed in polymeric compositions. A compatible plasticizer is one which incorporates integrally into the acrylonitrile. An incompatible plasticizer will bleed out of the surface of the roller, making the roller sticky and useless. It does not become an integral part of the roller composition. The plasticizers which are compatible with acrylonitrile rubbers, notably the esters such as dioctyl phthalate, dibutyl phthalate, dioctyl adipate, and dioctyl sebacate are among the most expensive.

The ink vehicles and roll cleaning compounds are highly effective solvents for most plasticizer materials including the esters. As a consequence, the plasticizers are slowly leached out of the roll and the roll becomes progressively harder and smaller in diameter, so necessitating frequent adjustment of the roller until the roller becomes too hard to perform its function. It should be noted that the leaching occurs with compatible plasticizers. With incompatible plasticizers, assuming such a roll to be useful at all, the extraction, of course, is immensely faster in that the working of the rubber forces the unincorporated plasticizer out.

The hydrolyzed polyurethane described above provides a plasticizer useful, in combination with one of the above mentioned esters, for acrylonitrile rubbers. In itself, it is not compatible with these rubbers, but in combination with an ester it does integrate into the roll and has the unusual characteristic of being substantially extraction-proof. A roll so plasticized may lose some of its ester in the course of use, but the hydrolyzed polyurethane stays incorporated in the substance of the roll, and thus dimensional stability and softness of the extent attributable to the hydrolyzed polyurethane remain permanent charcteristics in rolls thus far tested.

Thus, the hydrolyzed polyurethane provides not only a superior plasticizer but is available to the manufacturer at greatly reduced cost in that the polyurethane scrap is an ever-present product and the cost of hydrolysis is substantially less than the next most suitable plasticizers.

DESCRIPTION OF A PREFERRED EMBODIMENT

Cast polyurethane elastomers suitable for printing rollers are polyester or polyether based and cured with toluene diisocyanate, phenylene diisocyanate, triphenylmethane triisocyanate, etc.

A common specific polyurethane employed for rollers in the printing business is toluene diisocyanate-cured polydiethylene glycol adipate. The polyurethane may or may not include a filler such as silica or the like to the extent of 40%. It has been found that hydrolyzing this polyurethane, filled or unfilled, in an autoclave with steam at a temperature of from 290° 14 300° F. and at a pressure of 60 psi for a period of 16 hours gives a viscous liquid which serves the above described function of an admirable and inexpensive plasticizer for acrylonitrile rubbers. After the autoclaving, the viscous liquid should be filtered to get rid of charred material, ink solids, trash which always seems to find its way into scrap barrels, and unreacted polyurethane, if any. The speed of the reaction will be accelerated by chopping up the larger chunks of polyurethane, but the presence of metal trash may forbid this.

The hydrolysis will occur at temperatures lower than that described, down to about 212°, but the time required for the reaction will, of course, be considerably extended.

An illustrative formulation for a general purpose printing roller constructed in accordance with this invention is equal proportions by weight of dioctyl phthalate and the hydrolyzed polyurethane in the proportion of 36% of the combined plasticizers to 64% uncured acrylonitrile rubber with its appropriate vulcanizing agents. The mix is then cured.

Obviously, it is advantageous to substitute as much of the hydrolyzed polyurethane for the ester plasticizer as possible, both from the point of view of cost and from the point of view of superior extraction resistance. A limit to this substitution lies at the point where the hydrolyzed polyurethane demonstrates incompatibility with the roll material. Equal parts of the ester and polyurethane represent a safe, all-purpose proportioning of these two components. It is possible to increase the proportion of polyurethane up to a maximum of about 75%, depending on the proportion of the combined plasticizer employed in combination with the acrylonitrile-butadiene rubber, and with the specific formulation of that rubber. A less total proportion of plasticizer would permit a greater relative proportion of polyurethane to be used.

The proportion of total plasticizer to the rubber, of course, will depend on the degree of softening desired for any specific application.

The presence of the filler such as silica and the like in the hydrolyzed polyurethane may be regarded as essentially an "empty" factor; the net quantity of polyurethane in the polyurethane-filler mix is considered in arriving at the above proportions. Where hydrolyzed filled polyurethane is employed, the proportion of polyurethane to ester should be increased to compensate for the proportion of filler present. The filler in the polyurethane has negligible effect on the ultimate hardness of the roll.

I claim:

1. A method for modifying the hardness of an acrylonitrile-butadiene rubber which comprises mixing with the rubber and curing agents a proportion of plasticizer sufficient to modify the hardness of the cured rubber to the desired degree and curing the rubber-plasticizer mix, said plasticizer comprising a mixture, by weight of from 25% to 75% of an ester plasticizer and from 75% to 25% of a hydrolyzed polyester-based polyurethane elastomer produced by autoclaving said elastomer with steam at an elevated temperature and pressure until it becomes liquid, said ester plasticizer having the general miscibility characteristics, with respect to said rubber and said hydrolyzed elastomer, of dioctyl phthalate, dibutyl phthalate, dioctyl adipate, and dioctyl sebacate.

2. The method as defined in claim 1 wherein said elastomer is treated with steam at about 300° F. at 60 psi.

3. The method as defined in claim 1 wherein said plasticizer mixture comprises approximately equal parts of ester and hydrolyzed polyurethane.

4. The methd as defined in claim 1 wherein ester is taken from the group consisting of dioctyl phthalate, dibutyl phthalate, dioctyl adipate, and dioctyl sebacate.

* * * * *